INVENTORS
F. C. WILLIAMS
T. KILBURN AND
G. E. THOMAS
BY Moore and Hall
ATTORNEYS Jan. 25, 1955

F. C. WILLIAMS ET AL

DIGITAL COMPUTING MACHINE 2,700,588

Filed Nov. 10, 1950

4 Sheets-Sheet 2

INVENTORS
F. C. WILLIAMS
T. KILBURN AND
G. E. THOMAS

BY Moore and Hall
ATTORNEYS

INVENTORS
F. C. WILLIAMS
T. KILBURN AND
G. E. THOMAS
BY Moore and Hall
ATTORNEYS Jan. 25, 1955

F. C. WILLIAMS ET AL 2,700,588

DIGITAL COMPUTING MACHINE

Filed Nov. 10, 1950

4 Sheets-Sheet 4

INVENTORS
F. C. WILLIAMS
T. KILBURN AND
G. E. THOMAS

BY Moore and Hall
ATTORNEYS

United States Patent Office 2,700,588
Patented Jan. 25, 1955

2,700,588

DIGITAL COMPUTING MACHINE

Frederic Calland Williams, Timperley, and Tom Kilburn, Manchester, England, and Gordon Eric Thomas, Port Talbot, Wales, assignors to National Research Development Corporation, London, England, a British corporation Application November 10, 1950, Serial No. 195,042

Claims priority, application Great Britain November 16, 1949

15 Claims. (Cl. 346—74)

This invention relates to improvements in devices for applying electric signals to or reproducing electric signals from a magnetic recording medium and is particularly, although not exclusively, adapted for use in connection with magnetic storage devices for digital computing machines.

In general, electric signals are magnetically recorded by the following process. A conductor is interlinked with the magnetic circuit of a recording head so that a flux Q is produced in the magnetic circuit proportional to the current value $i$ of the signal in the conductor. Hence:

$$Q \alpha i \qquad (1)$$

This induced flux Q is retained in a magnetic recording medium which is arranged to form part of the magnetic circuit. The magnetically recorded signals are then reproduced by moving the magnetised recording medium past a gap in the magnetic circuit of a reproducing or pick-up head which is interlinked with a conductor so that an E. M. F. $e$ is produced in the conductor proportional to the rate of change of flux Q induced in the magnetic circuit.

Hence:

$$e \alpha \frac{dQ}{dt} \qquad (2)$$

It will be seen from the Equations 1 and 2 that the reproduced signal will be the differentiated form of the original signal and any sinusoidal component of the original signal will be reproduced in a similar but phase-displaced form. Hence, if the recorded signals are in synchronism with some external source and the subsequently reproduced signals are required also to be in synchronism with this external source it is necessary for the recording and reproducing heads to be displaced with respect to each other in the direction of movement of the magnetic recording medium.

A special case in which this spacing is necessary is in the number recording system for a computing machine described in the specification of copending patent application No. 146,446 in which the significance of a recorded digit in the binary system is given by the direction of flux-change half way through the digit period so that if the reproduction of the digit-representing signals is to be in step with the recording of such digit-representing signals it is necessary for the reproduction to commence half a digit period before the commencement of recording.

It is thus convenient for a combined recording and reproducing head to be built into a single structure so that the spacing distance between the recording and reproducing points can be accurately maintained.

Data, such as binary digital numbers being dealt with within an electronic digital computing machine, in the form of a multiplicity of discrete signals is frequently recorded on a magnetic recording medium having a rectangular surface and is arranged thereon as a series of discrete signals in a number of separate parallel tracks. Generally, such a recording medium is constituted by the curved surface of a rotating drum or wheel and the discrete signals are stored in order in each of a number of axially spaced parallel circumferential tracks so that a recording and reproducing head must be provided for each track.

In order that the position of the tracks may be accurately defined it is important that the relative position with respect to each other of the recording and reproducing heads for the various tracks is accurately maintained and it is therefore advantageous for a plurality of such combined recording and reproducing heads to be built as a single unitary structure, preferably with the various combined heads in axial alignment.

The object of the present invention is to provide a simple and robust structure which is capable of providing recording and/or reproducing facilities for each of a considerable number of closely spaced parallel tracks.

According to the broadest aspect of the invention a multiple magnetic recording and/or reproducing head comprises two similarly comb-shaped sheets of magnetic material clamped together longitudinally along the base of the teeth and with the respective teeth in register, the unclamped parts of the teeth of at least one of said sheets being bent first outwardly away from the opposite sheet and then inwardly again so that the free ends of the corresponding teeth are separated by only a narrow gap and so that a space is formed between said corresponding teeth for the reception of an electric winding interlinking the magnetic flux through at least one of said corresponding teeth.

According to a particular aspect of the invention, a multiple combined magnetic recording and reproducing head comprises three or more similarly comb-shaped sheets of magnetic material clamped together longitudinally along the base of the teeth with the teeth in register, the unclamped part of the teeth of the two outer sheets being bent first in an outwards direction and then in an inwards direction so that a space is formed between corresponding inner and outer teeth to receive suitable recording and reproducing windings which are interlinked with the outer teeth and so that a narrow gap is formed between the inner and outer teeth at the free ends of such teeth.

In a preferred form the outer surface of each of the outermost comb-shaped sheets of magnetic material is flanked by a similarly comb-shaped sheet of non-magnetic material shaped to correspond to the surface configuration of the adjacent magnetic sheet so as to act as a mechanical support for the latter.

In order that the various features of the invention may be more readily understood, embodiments thereof will now be described by way of illustrative example with reference to the accompanying drawings in which.

Figure 1:
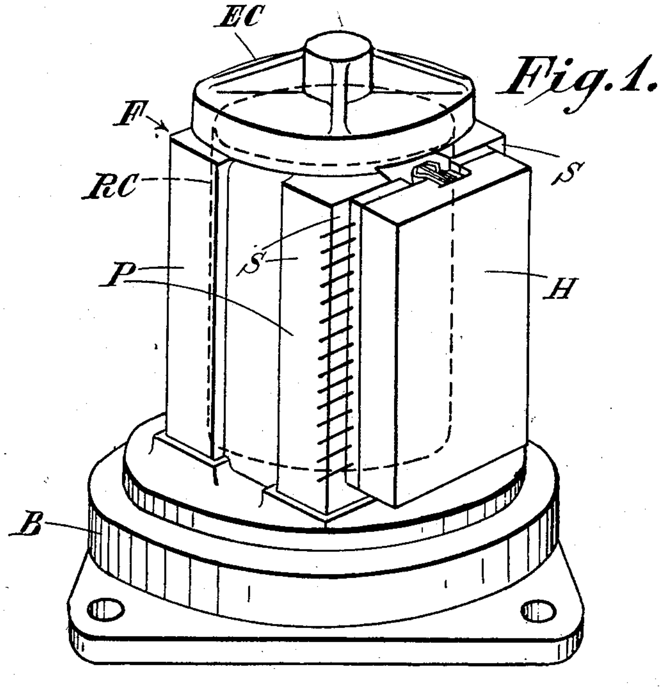
Fig. 1 is a simplified perspective view of a rotating drum type of magnetic store for use in a digital computing machine and to which the present invention is particularly applicable.

Referring first to Fig. 1, the magnetic store with which the particular embodiment of the invention to be described is adapted to cooperate comprises a cylindrical drum RC having an outer surface layer of magnetic recording material and rotatable about a vertical axis by means of an internal electric motor within a stationary framework F having vertical corner pillars P secured at their lower ends to a base B and at their upper ends to an end cap EC. The outer surfaces S of at least two of the pillars P are accurately machined parallel to the axis of the drum RC to provide mounting surfaces for a multiple combined recording and reproducing head H. As described in detail later, this head includes a plurality of separate and closely spaced combined heads each capable of recording upon and reproducing from an individual one of a similar number of closely spaced recording tracks running circumferentially around the surface of the drum.

The construction of the head H will now be described in detail with reference to Figs. 2 to 6. It consists principally of an assembly of comb-shaped sheet-form elements 1 to 9 providing a plurality of separate and distinct heads 21–35 each constituting a combined recording and reproducing head for cooperating with one of the tracks of the drum RC of Fig. 1.

Figure 3:
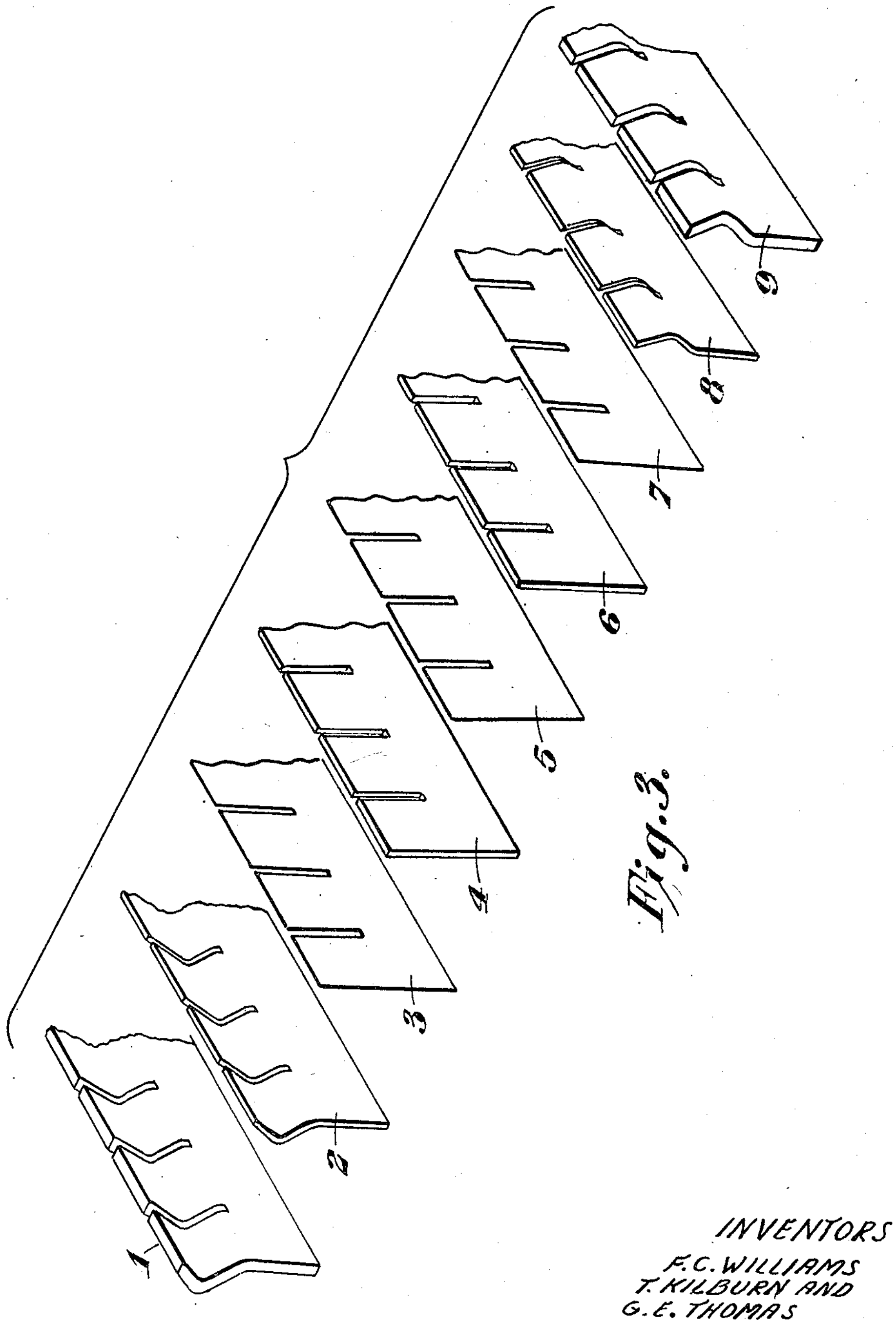
Fig. 3 is an exploded view similar to Fig. 2 showing the various elements in separated relationship.

As shown more clearly in the exploded view of Fig. 3, this assembly comprises a central sheet of paper 5 which separates two comb-shaped metallic sheets 4 and 6, hereinafter called inner pole members, which are made of a suitable ferromagnetic material such as that known by the registered trade-mark "Radiometal." These inner pole members 4 and 6 are flanked on either side by additional paper sheets 3 and 7 which separate the inner pole members from two generally similar comb-shaped sheets 2 and 8, which, however, have their respective tooth-forming portions bent firstly in an outwards direction from the hip level 17 at the bottom of the comb-forming slots and then in an inwards direction again so as to form empty spaces 18 and 19 between the inner surfaces of such teeth of the outer sheets 2 and 8 and the outer faces of the corresponding teeth of the adjacent inner pole members 4 and 6. The sheets 2 and 8 are made of similar ferro-magnetic metal to that used for the inner pole members 4 and 6 and form outer pole members which constitute, in conjunction with the latter, the recording and reproducing head pole-pieces. These outer pole members 2 and 8 are protected externally by two surrounding similarly comb-shaped shield plates 1 and 9 which are made of a non-magnetic metal such as brass.

Figures 2, 4:
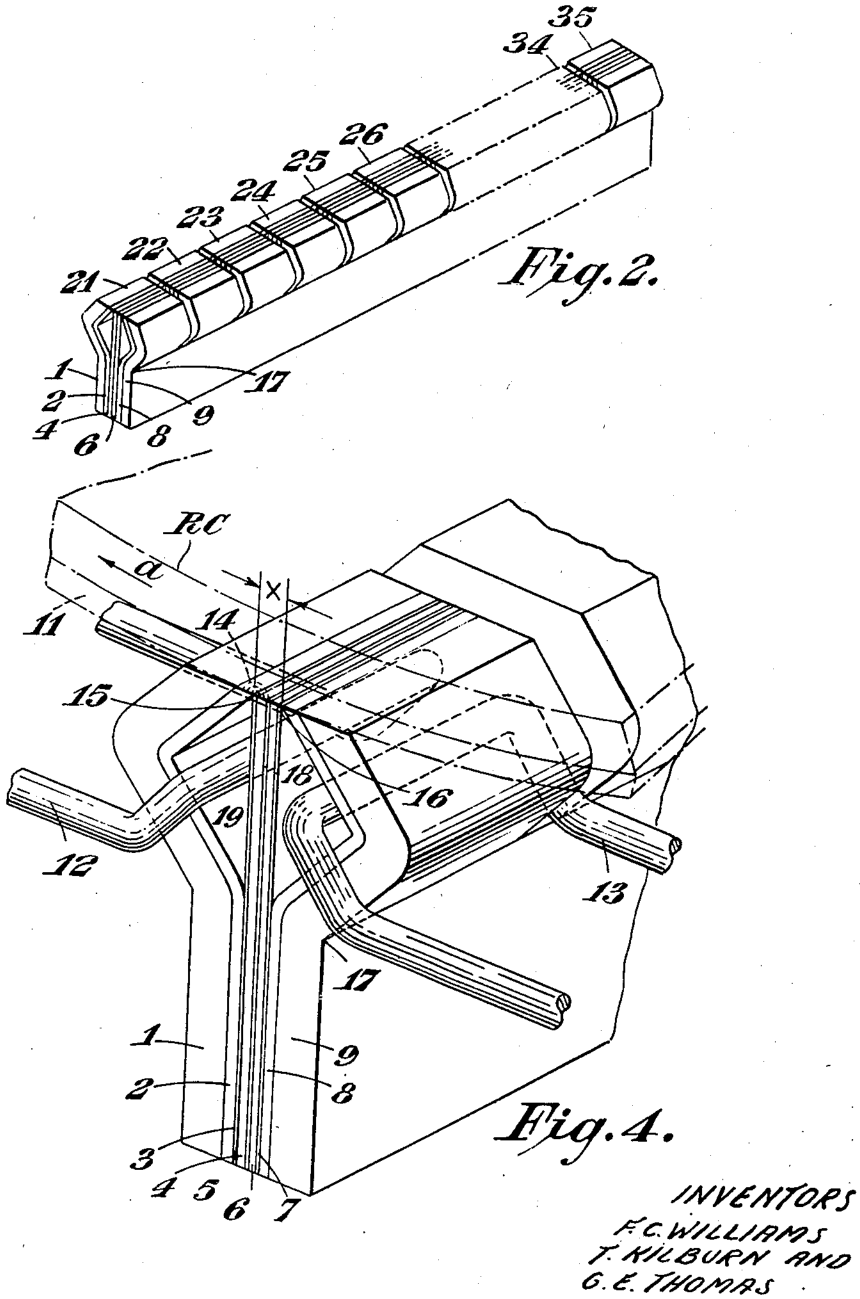
Fig. 2 is an isometric perspective view of an assembly of elements constituting a combined reproducing and recording head according to the invention.
Fig. 4 is a greatly enlarged perspective of one recording and reproducing section only of the assembly shown in Fig. 2 and illustrating the disposition of the interlinking windings.

Each of the sheets are provided with the necessary slots of rectangular cross-section required to give the comb-shaping by suitable stamping-out or cutting-out operations effected prior to assembly from the top edge down to the hip level 17 at corresponding positions throughout their lengths so that when assembled as shown in Fig. 2 the structure is divided longitudinally into the separate double or combined heads 21, 22, 23 . . . 35. In addition, the bending out and bending back of the comb-shaped portions of the outer pole members 2 and 8 from the hip level 17 is such that when assembled in the manner indicated in Figs. 2 and 4, the outermost edges of the outer pole pieces 2 and 8 are separated from the similar edges of the inner pole pieces 4 and 6 by at least the thin sheets of paper 3 and 7 so as to form respective recording and reproducing gaps 15 and 16 therebetween. The two triangular section spaces 18 and 19 serve to receive the necessary electrically conductive windings and these are conveniently provided prior to assembly in the manner shown in Fig. 4 by the interlinking of each tooth of each outer pole member with a conductive wire loop 12 or 13. The whole assembly of the component parts 1 to 9 with the associated series of conducting loops 12 and 13 for each of the pole pieces is then clamped together by suitable means and the remainder of the spaces 18 and 19 filled with a suitable insulating material which sets to a hardened state, such as shellac. The top or outer pole forming surface of the assembly as at 10 is then ground flat until the gaps 15 between the corresponding teeth of the pole members 2 and 4 and the similar gaps 16 between the teeth of the pole members 8 and 6 are of the desired width. The convergent form of the teeth of outer pole members 2 and 8 where they reapproach the inner pole members 4 and 6 together with the subsequent grinding operation ensures that each outer pole piece presents a sharp edge to its co-operating inner pole piece so that the reluctance of the leakage path for magnetic flux which fails to pass through the adjacent surface of the recording cylinder or drum is of relatively large value.

For operation, the assembly as described is positioned in the manner shown generally in Fig. 1 and with greater clarity in Fig. 4 so that the outer ground surface 10 embracing the magnetic flux gaps is just clear of the magnetic recording medium constituted by the surface layer 11 on the rotatable drum RC. The path of the flux in the magnetic circuit of the recording head then passes through the recording medium 11 in the manner indicated by the flux lines 14 in Fig. 4.

The operation of the arrangement as shown in Fig. 4 for storing a pulse signal as a corresponding magnetisation pattern on the recording drum is thus as follows. The signal is applied as a current pulse to the conductor 12 and produces a corresponding variation in the strength of the flux in the magnetic circuit of the pole pieces 2 and 4 and the region of the recording medium 11 immediately opposite at that instant and thus causes magnetisation to be induced in such opposite region of the recording medium 11 on the recording drum as it rotates past the gap 15. The pattern of magnetisation so formed will be retained until disturbed or removed by further applied magnetization such as by the existence of a pulse signal of a different nature in the conductor 11 as such magnetised region passes the gap 15 which latter will thereupon induce a correspondingly different magnetisation pattern.

The operation of this arrangement for reproducing a pulse signal corresponding to a pattern of magnetisation already present on the recording drum is as follows. As the magnetisation pattern, e. g. that of region 14 on the recording medium, moves past the gap 16 of the second magnetic circuit formed by the pole pieces 8 and 6 the strength of the flux in this latter magnetic circuit is changed so that a corresponding voltage pulse is generated in the interlinked conductor 13 and from which such pulse can be readily applied to any desired external circuits.

It will be clear that as the impedance of the recording and reproducing windings 12, 13 in the form shown is very low, a considerable current will be required for recording purposes and it is desirable to provide suitable step-down transformers for feeding each recording winding 12 and these should be in close proximity to the head itself to effect efficient power transfer. Conveniently the transformers may comprise common strips of core lamination material with pairs of closely spaced holes through which the appropriate windings are threaded. Such multiple transformer units may be mounted directly upon any support provided for the combined head structure.

Figure 7:
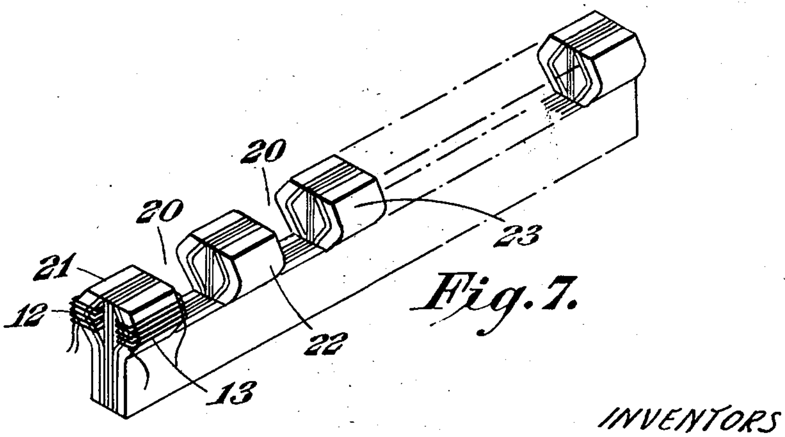
Fig. 7 is a perspective view similar to Fig. 2 of a modified arrangement.

For increasing the impedance of the windings, for example as an alternative to the provision of step-down transformers for use therewith, each pole piece may be provided with a plurality of turns as shown in Fig. 7.

Figure 5:
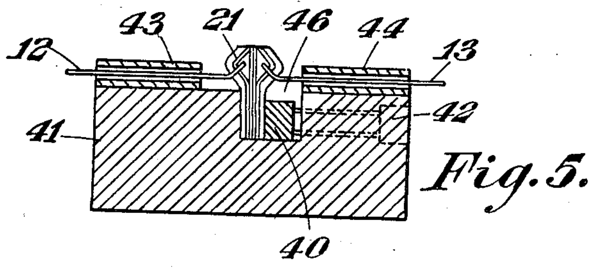
Figs. 5 and 6 show respectively in transverse cross-section and plan view, the multiple recording and reproducing head structure of the invention mounted in a securing block.
Figure 6:
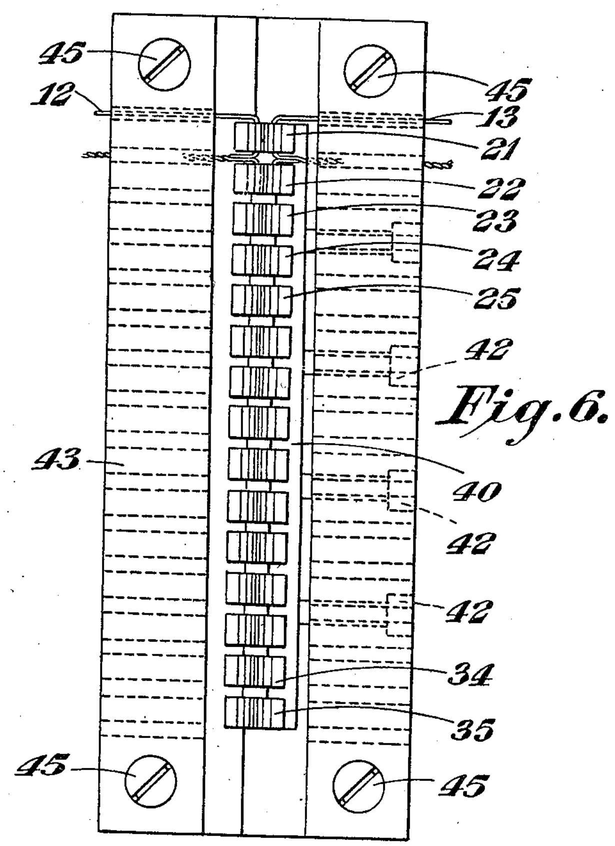

One preferred manner of mounting the multiple recording and reproducing head as described is shown in Figs. 4 and 5 in which the multiple assembly of heads 21 to 35 is mounted in a longitudinal slot 46 formed in a block 41, e. g. of rigid material such as brass. The multiple head structure is rigidly fixed in position by the pressure exerted by a clamping bar 40 under the action of a number of screws 42 against the shoulder formed by one side of the longitudinal slot 46. The conductors 12 and 13 which are interlinked respectively with the recording and reproducing head portions of the elements 21 to 35 are retained in position by locating strips 43 and 44 formed of insulating material and which are attached to the upper surface of the block 41 by screws 45 shown in Fig. 6. Conveniently the conductors or the leads therefrom are threaded through holes in these locating strips as shown. For some purposes adjacent conducting leads between adjacent head elements may be twisted together and electrically interconnected as by soldering to form only a single common connection in order to reduce the total number of external connections to be made to the multiple head unit.

As already stated the specification of the aforesaid co-pending application describes a method by which electrical pulse signals each representing one or the other of the binary digits "1" or "0" is applied to a magnetic drum and stored thereon as patterns of magnetisation characterised by the direction of reversal of magnetisation in the middle of the time interval allocated to each pulse signal, a direction of reversal in one sense signifying a "1" and in the opposite sense signifying a "0." As a result of this method of storing digital data the nature of the pulse signal to be read out of the magnetic store cannot be ascertained until half the time interval allocated to the pulse signal has elapsed. It is therefore desirable for the reproducing head to scan the magnetisation pattern on the recording surface half of this time interval ahead of the moment it is required and this is readily effected in the arrangement described without affecting the ability of the rotating drum to record and reproduce pulse signals alternately by arranging for the reproducing head, i. e. that constituted by the pole pieces 6 and 8 to lie ahead of the recording head, i. e. that constituted by the pole pieces 4 and 2 as viewed from the direction of the travel path of such magnetisation pattern on the rotating recording drum. This is achieved by causing rotation of the drum relative to the recording and reproducing heads to be in the direction indicated by the arrow *a* in Fig. 4 and at a speed such that any given point of the recording medium 11 on the surface of the drum is moved forwards by the amount of the distance X which corresponds to the distance between the respective gaps 15 and 16 of the recording and reproducing head elements in the time interval which is equal to the above mentioned half of that allocated to a pulse signal. The time spacing of the recording and reproducing head gaps may, for a given fixed velocity of the recording medium 11, be set to any desired value by appropriate selection of the thickness and number of the inner pole members 4 and 6 and/or by appropriate choice of thickness and number of the central non-magnetic separating sheets 5 inserted between the adjacent inner pole members.

The particular form of multiple head described has been engineered to provide ten recording tracks per inch of the transverse width of the recording surface, i. e. per inch of the longitudinal dimension of the strip form head structure of Fig. 2. This spacing dimension is, however, by no means a limitation and by suitable proportion of the teeth and slots of the comb-like parts a considerably greater number of tracks may be accommodated per inch. If even greater reduction of track spacing is desired or in order to produce some constructional simplification of the multiple head structures, e. g. to provide greater facility for providing the requisite windings, the combined heads may be designed as shown in Fig. 7 whereby the slots 20 between adjacent pole-forming teeth of the comb-like parts are relatively wider than the teeth themselves. With such a construction two or more multiple head arrangements may be employed in conjunction with one another at different circumferential or spacing positions relative to the recording medium and with their respective pole-forming teeth suitably staggered, transversely to the direction of movement of the recording medium whereby the tracks dealt with by the pole pieces of one multiple head lie in the gaps formed between the tracks dealt with by the other head or heads.

The invention is clearly not limited to the constructional form shown or to the provision at each head position of combined recording and reproducing facilities. For some purposes a single magnetic gap for each head may be sufficient and this may be achieved by using only one half of the elements described while, if desired, both pole-forming teeth may be bent to increase the available winding space. Alternatively a single comb-shaped sheet of ferromagnetic material similar to either one of the inner pole members 4 or 6 as shown may be employed as a common centre pole for both of adjacent recording and reproducing heads with, of course, omission of the central paper sheet 5.

We claim:

1. A multiple magnetic recording and/or reproducing head which comprises two similarly comb-shaped sheets of magnetic material clamped together longitudinally along the base of the teeth and with the teeth in register, the unclamped parts of the teeth of at least one of said sheets being bent first outwardly away from the opposite sheet and then inwardly again so that the free ends of the corresponding teeth are separated by only a narrow gap and so that a space is formed between said corresponding teeth for the reception of an electric winding interlinking the magnetic flux through at least one of said corresponding teeth.

2. A multiple combined magnetic recording and reproducing head which comprises at least three similarly comb-shaped sheets of magnetic material clamped together along the base of the teeth and with the teeth in register, the unclamped parts of the teeth of the two outer sheets being bent first in an outwards direction and then in an inwards direction so that a space is formed between corresponding inner and outer teeth for receiving appropriate electrical recording and reproducing windings and so that a narrow gap is formed between corresponding inner and outer teeth at the free ends of such teeth.

3. A multiple magnetic recording and/or reproducing head as claimed in claim 1 in which said similarly comb-shaped sheets of magnetic material are clamped between two generally similar comb-shaped supports of non-magnetic material, the unclamped parts of the teeth of such non-magnetic elements being similarly bent to those of the adjacent magnetic sheets to act as a physical support therefor.

4. A multiple combined magnetic recording and reproducing head as claimed in claim 2 wherein two separate intermediate comb-shaped sheets of magnetic material are clamped between said comb-shaped sheets having bent teeth to provide individual co-operating pole pieces for each of said outer bent teeth.

5. A multiple magnetic recording and/or reproducing head according to claim 1 wherein each of said windings comprise a single conducting loop passing once through the gap formed by bending the teeth of the outer magnetic sheets.

6. A multiple magnetic recording and/or reproducing head in accordance with claim 1 wherein each of said windings comprise a plurality of turns around said bent teeth of the outer magnetic sheets.

7. A multiple magnetic recording and/or reproducing head according to claim 1 in which the space between said bent teeth and the opposing teeth is filled with rigid insulating material after provision with the requisite winding.

8. A multiple magnetic recording and/or reproducing head according to claim 1 wherein the space between said bent teeth and the opposing teeth is filled with a fluid insulating material which sets to hardened condition.

9. A multiple magnetic recording and reproducing head according to claim 1 wherein non-magnetic spacing sheets are provided between the adjacent surfaces of said inner and outer pole-forming sheets, said non-magnetic spacing sheets extending to the region of the gap formed between the returned outer teeth of the outer magnetic sheet and the corresponding teeth of the inner magnetic sheet.

10. A multiple magnetic recording and reproducing head as claimed in claim 2 wherein two separate intermediate comb-shaped sheets of magnetic material are clamped between said comb-shaped sheets having bent teeth to provide individual co-operating pole pieces for each of said outer bent teeth and in which a non-magnetic spacing element is provided between each of said separate intermediate comb-like magnetic sheets.

11. A multiple magnetic recording and/or reproducing head as claimed in claim 1 wherein the slots between adjacent teeth of the comb-like parts is narrower than the similar width of the teeth whereby adjacent head elements co-operate with mutually adjacent recording tracks on the associated recording medium.

12. A multiple magnetic recording and/or reproducing head as claimed in claim 1 wherein the slots between adjacent teeth of the comb-like sheets are wider than the teeth whereby adjacent head elements co-operate with associated recording tracks on the recording medium which lie intermediate further tracks not dealt with by that head.

13. A multiple magnetic recording and/or reproducing head in accordance with claim 1 wherein the outer end faces of the convergent tooth portions of the magnetic sheets are ground to provide a sharpened edge on each outer pole piece along the line facing the co-operating inner pole piece.

14. A magnetic recording device comprising a recording surface constituted by the outer circumferential surface of a rotating drum and two multiple recording and/or reproducing heads disposed in fixed positions relative to the axis of rotation of said drum at circumferentially displaced positions around said drum, each of said heads comprising two similarly comb-shaped sheets of magnetic material clamped together longitudinally along the base of the teeth with the teeth in register and with the outer edges of the teeth in a common straight line, the unclamped parts of the teeth of at least one of said sheets being bent first outwardly away from the opposite sheet and then inwardly again so that the free ends of the corresponding teeth are separated by only a narrow gap and so that a space is formed between said corresponding teeth for the reception of an electric winding interlinking the magnetic flux through at least one of said corresponding teeth, the slots between adjacent teeth of the comb-like sheets of each head being of a width at least equal to the width of each tooth and said individual heads being mounted with the outer edges of said teeth at a common spacing distance from the surface of said drum and being staggered relatively to each other in the axial direction of the drum whereby the respective teeth thereon deal with alternate recording tracks on said drum.

15. A magnetic recording device comprising a recording medium constituted by the outer circumferential surface of a rotating drum and a plural number $n$ of multiple recording and/or reproducing heads disposed in fixed positions relative to the axis of rotation of said drum at circumferentially displaced positions around said drum, each of said heads comprising two similarly comb-shaped sheets of magnetic material clamped together longitudinally along the base of the teeth with the teeth in register and with the outer edges of the teeth in a common straight line, the unclamped parts of the teeth of at least one of said sheets being bent first outwardly away from the opposite sheet and then inwardly again so that the free ends of the corresponding teeth are separated by only a narrow gap and so that a space is formed between said corresponding teeth for the reception of an electric winding interlinking the magnetic flux through at least one of said corresponding teeth, the slots between adjacent teeth of the comb-like sheets of each head being of a width at least equal to $n-1$ times the width of each tooth and said individual heads being mounted with the outer edges of said teeth at a common spacing distance from the surface of said drum and being staggered relatively to each other in the axial direction of the drum whereby the respective teeth thereon deal with different groups of interlaced recording tracks on said drum.

References Cited in the file of this patent

UNITED STATES PATENTS

| | | |
|---|---|---|
| 2,026,330 | Tauschek | Dec. 31, 1935 |
| 2,424,633 | Rieber | July 29, 1942 |
| 2,540,654 | Cohen et al. | Feb. 6, 1951 |
| 2,649,506 | Gayford | Aug. 18, 1953 |